United States Patent [19]

Wood

[11] Patent Number: 5,784,191
[45] Date of Patent: Jul. 21, 1998

[54] FREQUENCY AGILE FILTER AND TECHNIQUE

[75] Inventor: Gary L. Wood. Centerville. Va.

[73] Assignee: The United States of America as represented by the Secretary of the Army. Washington, D.C.

[21] Appl. No.: 494,751

[22] Filed: Jun. 26, 1995

[51] Int. Cl.$^6$ ............ G02F 1/33; G02F 1/11; G02B 8/18
[52] U.S. Cl. ............ 359/308; 359/309; 359/285; 359/572
[58] Field of Search ............ 359/285, 286, 359/308, 309, 310, 312, 568, 573; 385/122

[56] References Cited

U.S. PATENT DOCUMENTS

| | | | |
|---|---|---|---|
| 3,851,951 | 12/1974 | Eveleth | 359/286 |
| 4,556,290 | 12/1985 | Roulot | 359/309 |
| 5,173,808 | 12/1992 | Auer | 359/588 |
| 5,410,371 | 4/1995 | Lambert | 359/285 |

Primary Examiner—Paul M. Dzierzynski
Assistant Examiner—Audrey Chang
Attorney, Agent, or Firm—Milton W. Lee; John E. Holford; Alain L. Bashore

[57] ABSTRACT

Combining a tristimulus filter, two lenses, and a crystalline colloidal array filter in an arrangement resulting in a visible optical limiter without substantial color distortion that can be used for eye or sensor protection. Only three nonlinear colloidal arrays are needed to Bragg reflect over the pass bands of the tristimulus filter. The nonlinear colloidal array is arranged so that the band reflected (at the least) completely overlaps the pass band of the tristimulus filter.

2 Claims, 1 Drawing Sheet

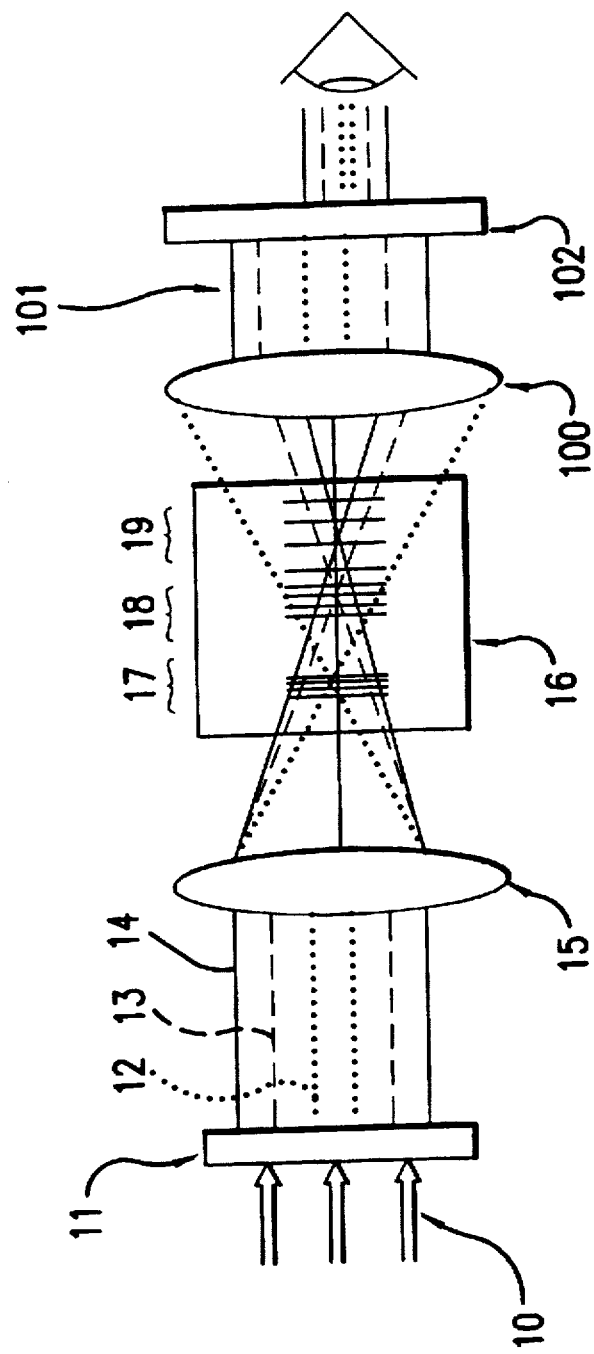

FREQUENCY AGILE FILTER AND TECHNIQUE

BACKGROUND OF THE INVENTION

1. Field of the Invention

The present invention generally relates to limiter devices and more specifically, to frequency agile optical bandpass filters that also provide minimal color distortion.

2. Description of Prior Art

The protection of optical components from laser damage is a key concern in the field of electro-optics. One type of device generically called limiter devices function to protect imaging sensors from catastrophic damage by high-intensity optical radiation. The design of limiters require the consideration of several operational requirements. The ideal limiter will restrict only hazardous radiation and allow the background scene to be fully transmitted. The limiter should have a bandwidth at least as large as the detector bandwidth. Response time should be faster than the incident laser pulse width. Recovery time ideally is faster than the duty cycle of the incident laser source. No degradation of the incident image should occur at any time, and the dynamic range is large enough to protect the detector at any incident radiation level with a single limiting device. Many types of limiter devices have been developed to attempt to fulfill these requirements.

Limiter devices in the prior art include mechanical and electro-optical shutters, various types of filters, and nonlinear optical materials which absorb, scatter, or reflect (or all three) incident radiation above some threshold value. While all of these devices have certain advantages, they suffer from various disadvantages which make them impractical or unusable for some types of threat radiations. With the advent of high-power pulsed lasers, mechanical shutters, because of their slow operation times with respect to the rise time of the laser pulse, are unacceptable protection devices. Moreover, such shutters are complex in that they, along with electro-optical shutters, require radiation sensing and shutter operation circuits. Although passive devices, such as interference filters, are inherently instantaneous, they are restricted to particular wavelengths or restricted wavebands and are sensitive to incident radiation angle. Two types of passive devices, the tristmulus filter and the colloidal array filter both have advantages and drawbacks which preclude their use except in certain instances.

The basic idea of the tristimulus filter is to allow the transmission of only three fairly narrow bands of wavelength in the region of the spectrum from wavelengths 400–700 nm. All other wavelengths are blocked to a high degree of optical density. The band pass wavelengths are chosen to minimize color distortion so prevalent in band blocking filters. The three pass bands are within the three primary colors; red, green, and blue. The band pass line width is designed for some acceptable overall optical density (O.D.=1–2) This filter by itself is a fairly good limiter if the pass bands do not fall within any of the presently demonstrated high power laser sources. For instance ruby lasers at 694 nm, doubled Nd:YAG at 532 nm, Ar+ ion lasers, and Kr+ laser wavelengths should be avoided. The tristimulus filter is made by multilayer stacks of dielectric coatings and have been manufactured for a variety of eyewear. The problem with the tristimulus filter is that it can not protect against a frequency agile laser threat. This would include a laser that operated at an unconventional wavelength in the band pass of the tristimulus filter. Such laser threats are possible by simply Raman shifting a standard laser line as given above or by other nonlinear optical techniques.

On the other hand, the crystalline colloidal array filter blocks a specific wavelength by Bragg reflection. This unique filter concept employs colloidal particles that self-assemble due to the repulsive interactions on the spheres. The repulsions derive from net charges on each sphere arising from ionization of surface sulfate groups which are attached during sphere synthesis.

By adjusting the sphere size and the density of spheres it is possible to adjust the spacing of the self-assembled lattice. The index mismatch between the spheres and the host material causes light to reflect from the lattice and the spacing determines the Bragg angle of reflection. The transmitted light at the Bragg angle can be very low, $T=10^{-8}$. The angle of incidence away from the Bragg angle that still has a high optical density is related to the line width. For instance, a small line width will result in a small angle of deviation that still has a high optical density.

By themselves these colloidal filters have little advantage over conventional dielectric interference filters. They pass most wavelengths and block a single narrow band. Such filters as rouges, or multi-stack dielectric filters can do the same thing. The real value of the colloidal filter for optical limiting is the ability to make them into nonlinear filters. The nonlinear colloidal filter would operate by index matching the lattice spheres to the host material. The spheres or the host material or both are made of a material that changes index of refraction upon illumination, $n=n_0+\Delta n(I)=n_0+n_2 I$. This allows for no Bragg reflection at low intensity but index mismatch and Bragg reflection at high intensity. Such filters are presently available utilizing thermal nonlinearities and in semiconductor materials. The filter can now operate only when the intended high intensity wavelength is present. However this filter will only operate over a small bandwidth. In order to cover a larger bandwidth it is necessary to stack multiple layers of the nonlinear filters that each reject a particular bandwidth so that the entire desired rejection bandwidth can be covered. This could require a large number of filters in order to cover the entire visible spectrum and because each filter has some residual absorption loss the stack would suffer an unacceptable transmission loss for practical viewing.

While the prior art has reported using passive devices none have established a basis for a specific apparatus that is dedicated to the task of resolving the particular problem at hand. What is needed in this instance is an optical limiter filter device that combines the designs of both the tristmulus and colloidal array filters, thus providing a filter that not only yields minimal color distortion but is also able to protect against a frequency agile laser threat.

SUMMARY OF THE INVENTION

It is therefore one object of the invention to provide a optical limiter filter device that not only yields minimal color distortion but is also able to protect against a frequency agile laser threat.

According to the invention, there is disclosed an optical limiter filter device and technique for providing output protection against a frequency agile laser threat with minimal color distortion incident light first passes through a tristimulus filter so that only blue light, green light and red light are passed. A first lens then focuses the radiation into a nonlinear Bragg cell so that the three colors are separated within the nonlinear Bragg cell. There is thus achieved three regions within the cell (or three cells) that have the correct grating spacing for the three colors. The high intensity of the focused radiation allows the gratings to be revealed. In an alternate embodiment there would be utilized a lens that focuses all the colors to the same plane and have a grating that is a superposition of the three rejection wavelengths.

A second lens recorrects the chromatic aberration and sends light to an eyepiece which makes the light presentable to the eye (or detector). At low intensities, such as looking at a sun light scene, the nonlinear Bragg cell is not apparent because the index of the grating and the surrounding material in the Bragg cell are index matched. The three primary colors are transmitted and the scene has little color distortion but is diminished in brightness. The high intensity of a laser causes the index mismatch of the grating and surrounding material so that the laser light is rejected by reflection. The laser might be of a single wavelength, say red, or there may be many lasers and all three Bragg gratings are rejecting radiation.

BRIEF DESCRIPTION OF THE DRAWINGS

The foregoing and other objects, aspects and advantages will be better understood from the following detailed description of a preferred embodiment of the invention with reference to the drawings, in which:

The sole drawing figure is front view the present invention superimposed over an optical ray trace diagram.

DETAILED DESCRIPTION OF A PREFERRED EMBODIMENT OF THE INVENTION

The method disclose herein involves combining a tristimulus filter with a nonlinear Bragg reflector set for the three pass bands, thus providing the means to eliminate high intensity radiation from damaging (or overwhelming) a detector or eye. The tristimulus filter passes three spectral bands such that the observer maintains good color integrity, i.e.: red, green and blue. By choosing the three pass bands to be narrow (the more narrow the darker the scene and the more sensitive to angular displacement) and away from other commercial laser lines the filter blocks most threat lasers. The nonlinear Bragg reflector to be used is a "thick" layer of index gratings designed to reflect radiation about a spectral bandwidth in such a way as to coherently add constructively in the backward direction and add destructively in the forward direction. The Bragg reflectors need to be designed to reject the three pass bands of the tristimulus filter. However, the Bragg reflectors can only operate at high incident intensity, otherwise nothing would get through the device. The Bragg reflectors need to be made of two or more different materials such that at low intensity the materials all present the same index of refraction and no grating is apparent. By making the materials have different nonlinear indices of refraction the Bragg grating appears. The grating depth is proportional to the intensity but the wavelength rejection is fixed for the three pass bands. Ideally, the Bragg gratings are able to reject over the pass bandwidth. Design parameters include: acceptable transmission, the ability to overlap the Bragg rejection bandwidth with the tristimulus bandwidth, and the potential to damage of the nonlinear Bragg cell since it is near focus.

As shown in the sole drawing figure, incident light 10 first passes through tristimulus filter 11 so that only blue light 12 (dotted line), green light 13 (dashed line) and red light 14 (solid line) are passed. Incident light 10 in the present embodiment is white light to show the example of the worst case scenario of a very broad band (white light) input pulsed laser. Lens 15 then focuses the radiation into nonlinear Bragg cell 16. Lens 15 in the present embodiment is a special lens that has a large chromatic aberration so that the three colors are separated within nonlinear Bragg cell 16. There is thus achieved three regions within the cell (or three cells) that have the correct grating spacing for the three colors. Regions 17, 18, and 19 are depicted within the single cell corresponding to the gratings for blue, green, and red light respectfully. The high intensity of the focused radiation allows the gratings to be revealed. In an alternate embodiment there would be utilized a lens that focuses all the colors to the same plane and have a grating that is a superposition of the three rejection wavelengths.

Lens 100 recorrects the chromatic aberration and sends light 101 to eyepiece 102 which makes the light presentable to the eye (or detector). At low intensities, such as looking at a sun light scene, the nonlinear Bragg cell is not apparent because the index of the grating and the surrounding material in the Bragg cell are index matched. The three primary colors are transmitted and the scene has little color distortion but is diminished in brightness. The high intensity of a laser causes the index mismatch of the grating and surrounding material so that the laser light is rejected by reflection. The laser might be of a single wavelength, say red, or there may be many lasers and all three Bragg gratings are rejecting radiation.

Lens 15 may be almost any lens that will separate the colors describe herein. Lens 100 which acts to recollimate the colors is unique. Most lens materials have what is known as normal dispersion. That is, the shorter wavelengths bend more than the longer wavelengths across the visible spectrum. As a result, the index of refraction for the blue light is greater than for the red light. Lens 15 will be made of this material. The amount of color separation is characterized by the Abbe number. The larger the Abbe number the smaller the chromatic dispersion. Lens 100 as a recollimating lens needs to have anomalous dispersion. The red needs to bend more than the blue light. Lens 100 therefore should have the negative Abbe number of lens 15 to recollimate the light. Materials that exhibit anomalous dispersion are much rarer. Recently there has been more anomalous dispersion materials to choose from in the form of liquid lenses, which is the lens of the preferred embodiment.

The design of filter 11 for the preferred embodiment is found from the article by G. L. Wood, W. W. Clark, 111, and E. J. Sharp, "Evaluation of Thermal Defocusing, Nonlinear Scattering, and Nonlinear Quarter-Wave Stack Switches," SPIE Proceedings on Electro-Optical Materials for Switches, Coatings, Sensor Optics, and Detectors, Vol. 1307, pg. 376 (1990). In this article there is disclosed a design for a nonlinear rejection filter about a specific wavelength. Two different materials are used with matched indices of refraction at low input intensities and, above some threshold intensity, the indices are different. Although with these materials a linear relationship of index with intensity does not exist, as it does for most materials, the bivalued nature of the index is typical of a material driven through a phase transition. The more general case can be found in C. J. Herbert, W. S. Capinski, and M. S. Malcuit, "Optical Power Limiting with Nonlinear Periodic Structures," Opt. Lett. 17, 1037 (1992).

In the preferred embodiment the following illustrates the design parameters of this device using the geometry of Fig.1. It is understood that the invention is limited to the preferred embodiment described herein. The tristimulus filter design should pass a red, green, and blue band. The more light passed the larger the overall transmission. However, filter 11 should avoid the most common and powerful laser emission wavelengths. At the red end of the spectrum We would like to avoid 633 and 694 nm, the HeNe and Ruby laser lines respectively. Suppose we pass a band from 645–675 nm. In the green we should stay away from the doubled glass and Nd:YAG laser lines at 530–532 nm. Since the doubled YAG line is easily Raman shifted it would be good to avoid the green from 530 nm up to 560 nm. So the 490–520 nm band could be the green pass band. In the blue we could pass 450–480 nm. Now the response of the eye is not uniform across these three pass bands. Due to this fact it may be necessary to narrow the green passband where the peak of the eye transmission resides. Filter 11 is designed with three 30 nm pass bands as stated in the red, green and blue. The red pass band would require a $\Delta n$ of approximately 0.1 if n background is 1.5. With this index change we can expect approximately a 5000 times reduction in intensity (an optical density of approximately 4) for about 100 layers of alternating nonlinear (phase change) material and linear index material. For green we get a $\Delta n$ of approximately 0.14 if n background is 1.55. Also with blue we get a $\Delta n$ of approximately 0.16 if n background is 1.6. For green and blue we don't need as many as 100 layers to get the 5000×intensity change but we would still need more than 50 layers.

It may be desirable to add field-of-view to make the nonlinear array reflection band larger than the tristimulus pass bands. At low intensities the tristimulus filter only allows the three pass wavelengths to transmit reducing the total transmitted intensity. The nonlinear colloidal arrays are index matched so they present no loss except for the losses of the three array materials on a whole. This total loss must be kept to some acceptable transmission level for viewing. The tristimulus filter easily rejects the threat wavelength when it is outside the pass bands. When the threat wavelength is within the one or more of the pass bands the nonlinear colloidal array will Bragg scatter the wavelength and provide protection. With only three bandwidths to provide Bragg reflection for the overall number of nonlinear arrays is greatly reduced and the overall transmission is significantly increased. In addition, the thickness of the device is reduced and the simplicity and cost of manufacturing the device is greatly reduced. The design of filter 11 at focal plane with little to no chromatic aberration in focusing lens may also be achieved. The index profile will be a superposition of the three separate interference filters designed for each respective pass band. The thickness of one cycle is given by the length of the dielectric stack divided by the number of cycles. It is assumed that the material is much thicker than the optical wavelength.

The nonlinear colloidal array (bragg cell) will most likely need to be placed at an intermediate focal plane in order to benefit from an increased intensity. The magnitude of the Bragg reflection is dependent on the index mismatch so it is important to make $\Delta n$ as large as possible. Increasing the intensity by placing the nonlinear colloidal array at a focal plane helps to accomplish this. A nonlinear material with a large nonlinearity may not require the intermediate focal plane but presently it seems unlikely. It is well known that resonant nonlinearities can be very large. However, these nonlinearities are usually also absorbing and could reduce the overall transmission through the device. It seems possible to use the large resonant nonlinearities at the three particular pass bands of the tristimulus filter in a dilute enough form to make an acceptable nonlinear device. A resonant material such as dyes could be attached to the spheres or put into the host only.

Optical damage to a device with a large nonlinearity that does not require an intermediate focal plane will be very unlikely. Most of the transmission losses will occur due to reflection not absorption so the high power threat is diverted away from the device. With devices that require an intermediate focal plane damage is a concern even with transmitting materials. The tristimulus filter does not need to be at the focal plane so it should be as far away as possible. This may require the tristimulus filter to be physically separated from the colloidal array. The nonlinear colloidal array should be positioned at the focal point to achieve the maximum intensity and hence the maximum reflectance. The array should be able to achieve damage thresholds comparable to transmitting materials since again it is not an absorbing device. The device would ideally operate with the colloidal array entirely within twice the Rayleigh range.

While this invention has been described in terms of preferred embodiment consisting of the filter described here within, those skilled in the art will recognize that the invention can be practiced with modification within the spirit and scope of the appended claims.

Having thus described my invention, what I claim as new and desire to secure by Letters Patent is as follows:

1. An optical limiter filter device providing output protection against a frequency agile laser threat without substantial color distortion, comprising:

a tristimulus filter which passes incident light only of the primary colors as output radiation, a first lens for focusing the output radiation as focused output radiation;

a bragg cell which accepts the focused output radiation and bragg reflect the primary colors into separated primary colors;

a second lens which recollimates the separated primary colors of the bragg cell output by anomalous dispersion;

an eyepiece which focuses the second lens output so that there is achieved a device output of incident light that is protected against a frequency agile laser threat without substantial color distortion.

2. A method for providing output protection against a frequency agile laser threat without substantial color distortion, comprising:

filtering incident light such that there is passed only the primary colors as output radiation, focusing the output radiation of the primary colors as focused output radiation;

bragg reflect the primary colors of the focused output radiation into separated primary colors;

recollimating the separated primary colors of the bragg reflected output by anomalous dispersion;

focusing the recollimated light so that there is achieved a device output of incident light that is protected against a frequency agile laser threat without substantial color distortion.

* * * * *